(12) United States Patent
Van De Woestyne et al.

(10) Patent No.: US 12,256,657 B2
(45) Date of Patent: Mar. 25, 2025

(54) IMPLEMENT MOUNTED SENSORS SENSING SEED AND RESIDUE CHARACTERISTICS AND CONTROL

(71) Applicant: Deere & Company, Moline, IL (US)

(72) Inventors: Bradley W. Van De Woestyne, Wes Des Moines, IA (US); Bradley J. Hitchler, Baxter, IA (US); Justin A. Borgstadt, West Des Moines, IA (US); Anil Kumar Telikicherla, Urbandale, IA (US); Oosman Saeed, Ankeny, IA (US)

(73) Assignee: Deere & Company, Moline, IL (US)

(*) Notice: Subject to any disclaimer, the term of this patent is extended or adjusted under 35 U.S.C. 154(b) by 1065 days.

(21) Appl. No.: 17/156,778

(22) Filed: Jan. 25, 2021

(65) Prior Publication Data

US 2022/0232753 A1 Jul. 28, 2022

(51) Int. Cl.
*A01B 79/02* (2006.01)
*A01B 35/16* (2006.01)
(Continued)

(52) U.S. Cl.
CPC .............. *A01B 79/02* (2013.01); *A01B 35/16* (2013.01); *A01C 7/044* (2013.01); *A01C 7/105* (2013.01); *A01C 7/20* (2013.01); *A01C 5/064* (2013.01)

(58) Field of Classification Search
CPC ......... A01B 79/02; A01B 35/16; A01C 7/044; A01C 7/15; A01C 7/20; A01C 5/064; A01C 7/105
See application file for complete search history.

(56) References Cited

U.S. PATENT DOCUMENTS 8,393,407 B2 * 3/2013 Freed ................. A01B 35/28
172/551
9,883,626 B2 * 2/2018 Heim .................. A01C 21/005
(Continued)

FOREIGN PATENT DOCUMENTS

WO WO2019236990 A1 12/2019
WO WO2020039322 A1 2/2020

OTHER PUBLICATIONS

Extended European Search Report and Written Opinion issued in European Patent Application No. 22152626.2, dated Jun. 24, 2022, in 09 pages.

*Primary Examiner* — Jamie L McGowan
(74) *Attorney, Agent, or Firm* — Kelly, Holt & Christenson; Joseph R. Kelly

(57) ABSTRACT

A mobile agricultural machine includes a row unit having a furrow opener mounted to the row unit and configured to engage a surface of ground over which the mobile agricultural machine travels to open a furrow in the ground. A furrow closer is mounted to the row unit behind the furrow opener relative to a direction of travel of the mobile agricultural machine and is configured to engage the surface of the ground to close the furrow. An image sensor system is mounted to the row unit and configured to sense characteristics of residue and seeds in the furrow opened by the furrow opener and generate a sensor signal indicative of the characteristics. The mobile agricultural machine can further include a control system configured to generate a residue/seed characteristic indicator corresponding to the sensed characteristics and to generate an action signal to control an action of the mobile agricultural machine based on the residue/seed characteristic indicator.

20 Claims, 13 Drawing Sheets

(51) Int. Cl.
*A01C 7/04* (2006.01)
*A01C 7/10* (2006.01)
*A01C 7/20* (2006.01)
*A01C 5/06* (2006.01)

(56) References Cited

U.S. PATENT DOCUMENTS

| | | | |
|---|---|---|---|
| 10,255,670 B1* | 4/2019 | Wu | H04N 7/183 |
| 10,820,490 B2* | 11/2020 | Schoeny | A01C 7/205 |
| 2017/0112043 A1 | 4/2017 | Nair et al. | |
| 2018/0310469 A1* | 11/2018 | Posselius | A01C 7/205 |
| 2020/0107494 A1* | 4/2020 | Schoeny | A01C 5/064 |
| 2020/0390026 A1* | 12/2020 | Walter | A01C 1/025 |
| 2022/0217898 A1* | 7/2022 | Walter | A01C 5/062 |

* cited by examiner

IMPLEMENT MOUNTED SENSORS SENSING SEED AND RESIDUE CHARACTERISTICS AND CONTROL

FIELD OF THE DESCRIPTION

The present description relates to agricultural machines. More specifically, the present description relates to the control of agricultural machines based on characteristics sensed by a sensor system mounted to the agricultural machine.

BACKGROUND

There are a wide variety of different types of agricultural machines that can be used in a wide variety of agricultural operations. Some of the agricultural machines can include a variety of sensors that sense different characteristics. For example, the sensors can sense characteristics of the agricultural surface upon which the agricultural machines can operate and/or characteristics relative to the operation and performance of the agricultural machine.

Some agricultural machines include planters that have row units. For instance, a row unit is often mounted on a planter with a plurality of other row units. The planter is often towed by a tractor over soil where seed is planted in the soil, using the row units. The row units on the planter follow the ground profile by using a combination of a downforce assembly, that imparts a downforce on the row unit to push disc openers into the ground to open a furrow, and gauge wheels to set the depth of penetration of the disc openers.

The discussion above is merely provided for general background information and is not intended to be used as an aid in determining the scope of the claimed subject matter.

SUMMARY

A mobile agricultural machine includes a row unit having a furrow opener mounted to the row unit and configured to engage a surface of ground over which the mobile agricultural machine travels to open a furrow in the ground. A furrow closer is mounted to the row unit behind the furrow opener relative to a direction of travel of the mobile agricultural machine and is configured to engage the surface of the ground to close the furrow. An image sensor system is mounted to the row unit and configured to sense characteristics of residue and seeds in the furrow opened by the furrow opener and generate a sensor signal indicative of the characteristics. The mobile agricultural machine can further include a control system configured to generate a residue/seed characteristic indicator corresponding to the sensed characteristics and to generate an action signal to control an action of the mobile agricultural machine based on the residue/seed characteristic indicator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

During the performance of various agricultural operations, it can be helpful to have data indicative of characteristics relative to the agricultural surface, the quality of the job being performed, the operation of the agricultural machine, as well as various other data. In the example of planting, for instance, it can be helpful to understand the characteristics and quality of the environment that the seeds are being placed into. Several agronomic factors and machine operation parameters can have an affect on the characteristics and quality of that environment.

For example, residue can have an effect on the development of seeds planted in a field. When residue is closely proximate (or touching) a seed in a furrow, it can affect the thermal and moisture transfer from the soil to the seed. Therefore, residue can affect the uniformity and rate with which seeds germinate. Similarly, seeds can be affected by chemicals released from residue as the residue deteriorates. Further, residue that is on the surface of the field, or near the surface of the field (such as within the top two inches of the soil) can inhibit soil warming by reflecting light. Thus, even if the residue is not adjacent to a seed, or touching a seed, it can still affect the rate of seed germination. In addition, residue can present a physical barrier to root growth or emergence (depending on whether the residue is below or above the seed), and it can draw or otherwise increase the incidents of disease and insects. The non-uniform emergence of seeds related to the affects of residue leads to competition between adjacent plants, and can affect yield by as much as 5-10%.

The present description thus proceeds with respect to a planting machine that has an image sensor mounted (such as behind a furrow opener and ahead of a furrow closer) and which captures images of an area proximate the furrow. A system then identifies residue characteristics, and seed characteristics, in the images. For instance, the system can identify seed and residue distribution and the location of residue relative to the location of seeds. The system generates an action signal based upon the seed and residue characteristics identified in the images. The action signal can be used, for instance, to control communication with another system, to control different settings on the planting machine, to manipulate residue or seed in the furrow or proximate the furrow, among other things.

Figure 1A:
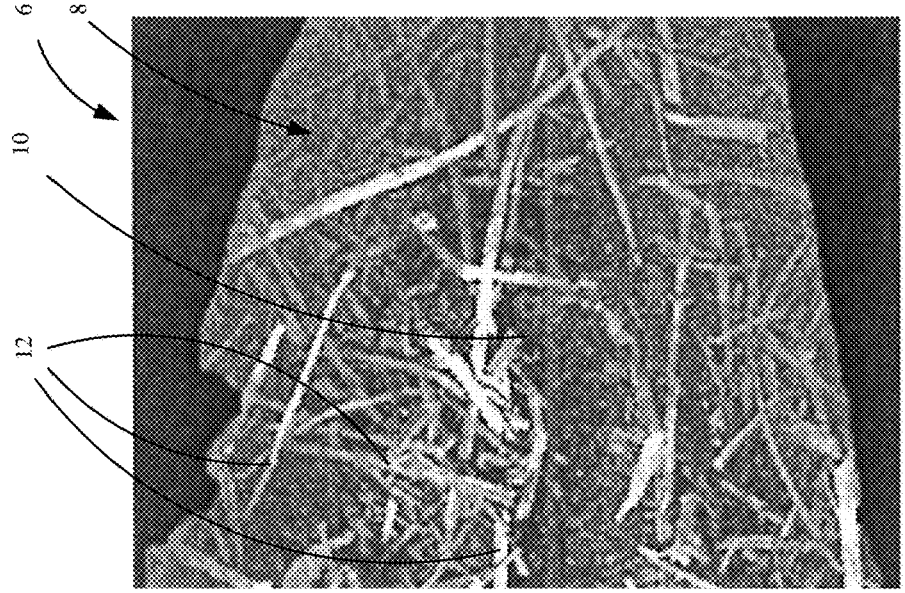
FIGS. 1A-C show example images of an agricultural surface.
Figure 1B:
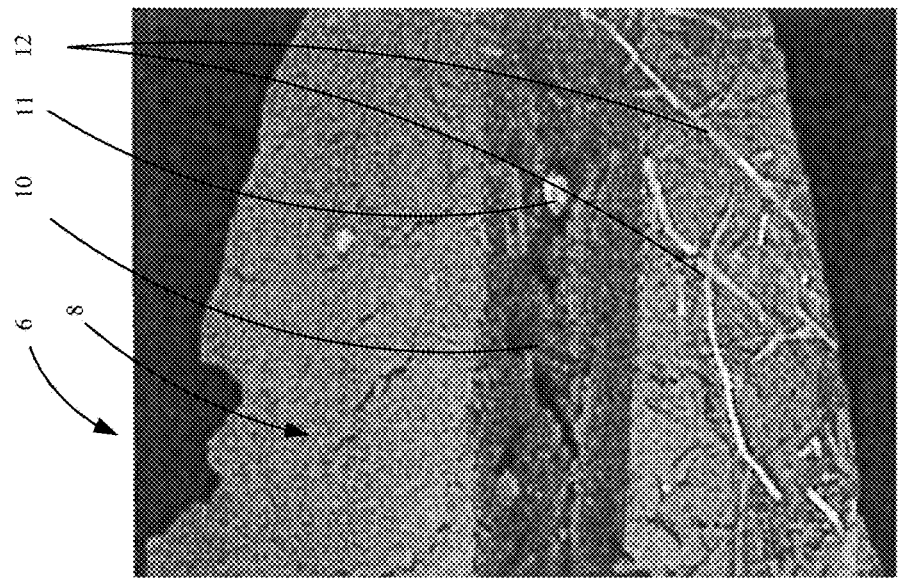
Figure 1C:
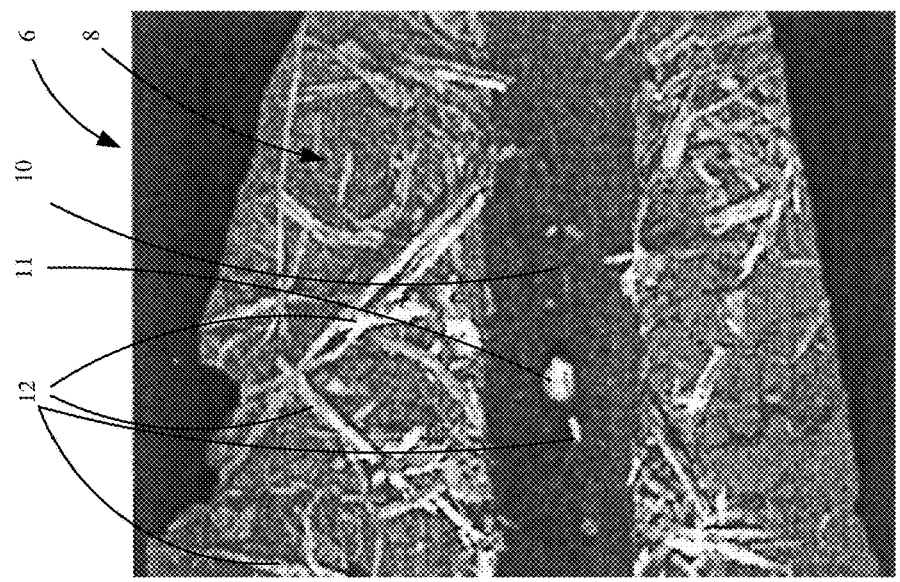

FIGS. 1A-C show examples of images of agricultural surfaces having been operated on by an agricultural machine. Generally, FIGS. 1A-C show a sensor output (e.g., an image taken by a camera) indicative of the level of residue relative to a furrow opened by a planter. Image 6 in FIG. 1A includes agricultural surface 8, furrow 10 and residue 12.

As can be seen in FIG. 1A, there is heavy residue and no seeds are visible, because they are covered by residue. Thus, the residue will significantly affect soil warming and the thermal and moisture transfer from the soil to the seed. Similarly, the residue may present a physical barrier to root growth and emergence and may increase the affects of insects, chemicals, and diseases on the seed.

In FIG. 1B, there is little residue and the furrow quality is high. FIG. 1B shows seed 11 in furrow 10 and that there is little residue 12 proximate seed 11, on the soil surface, or in the top several inches of soil. Thus, residue 12 will have less of an impact on the development of seed 11 than the residue shown in FIG. 1A.

In FIG. 1C there is heavy residue 12 on the soil surface, but relatively little residue 12 in the furrow 10. FIG. 1C also shows that there are some small pieces of residue 12 close to, but not contacting, seed 11. Therefore, the residue 12 shown in FIG. 1C will have more of an impact on the development of seed 11 than that shown in FIG. 1B, but less than that shown in FIG. 1A.

Figure 2:
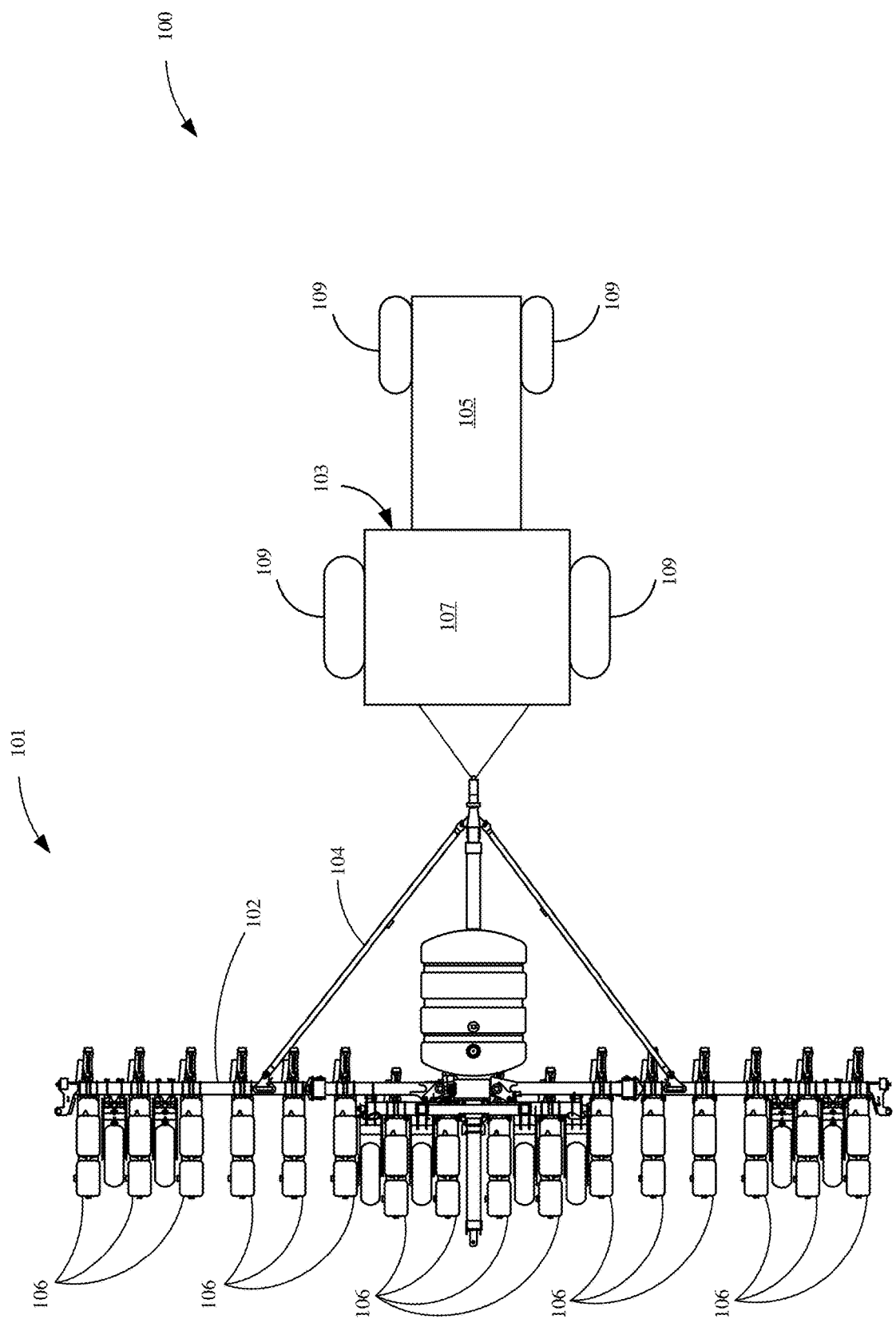
FIG. 2 shows one example of a top view of an agricultural machine.

FIG. 2 is a top view of one example of an agricultural machine 100. Agricultural machine 100 illustratively includes planter 101 and towing vehicle 103. Planter 101 includes a toolbar 102 that is part of a frame 104. FIG. 1 also shows that a plurality of row units 106 are mounted to toolbar 102. Planter 101 can be towed by towing vehicle 103, such as a tractor. Towing vehicle 103 can include a propulsion system, such as an engine, housed in engine compartment 105, ground engaging elements 109, such as wheels or tracks, an operator compartment 107, such as a cab, which can include a number of machine control mechanisms, user input mechanisms, as well as displays and other user interfaces. Towing vehicle 103 can be linked to planter 101 in a variety of ways, including, but not limited to, mechanically, electrically, hydraulically, pneumatically, etc. Through such linkage, an operator can control vehicle 103 to provide power to planter 101 and/or control the operation of planter 101, from the operator compartment 107 for example.

Planter 101 can also include a material reservoir such as tank 111, that carries material that can be transmitted to row units 106 for application on the field. The material may be seed, fertilizer, or other material.

Figure 3:
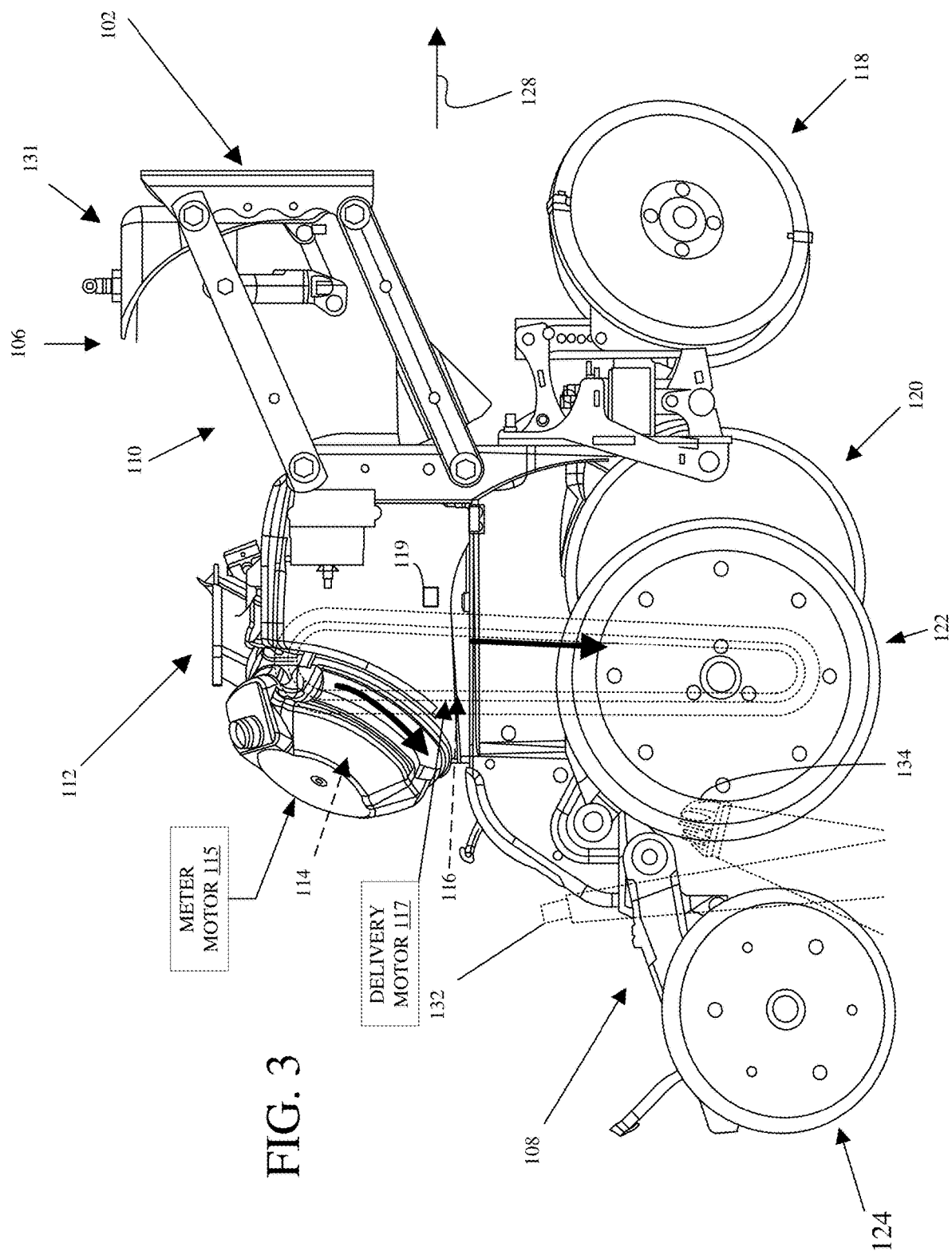
FIG. 3 shows one example of a side view of a row unit of an agricultural machine.

FIG. 3 is a side view showing one example of a row unit 106. FIG. 3 shows that each row unit 106 illustratively has a frame 108. Frame 108 is illustratively connected to toolbar 102 by a linkage generally shown at 110. Linkage 110 is illustratively mounted to toolbar 102 so that linkage 110 can move upwardly and downwardly (relative to toolbar 102).

Row unit 106 also illustratively includes a row cleaner 118, a furrow opener 120, a set of gauge wheels 122, a set of closing wheels 124, and a seed hopper 112 that stores seed. The seed is provided from hopper 112 to a seed metering subsystem 114 that is driven by a meter motor 115 and that meters the seed and provides the metered seed to a seed delivery system 116. Seed delivery subsystem 116 is driven by a delivery motor 117 and delivers the seed from the seed metering subsystem 114 to the furrow or trench generated by furrow opener 120 on row unit 106. In one example, seed metering subsystem 114 uses a rotatable member, such as a disc or concave-shaped rotating member, and an air pressure differential to retain seed on the disc and move it from a seed pool of seeds (provided from hopper 112) to the seed delivery subsystem 116. Other types of meters can be used as well. Delivery subsystem 116 can be a continuous member, such as a brush belt, a flighted belt, or another continuous member that obtains seed from metering subsystem 114 and delivers it to the furrow. Subsystems 114 and 116 can have one or more seed sensors 119 that detect seeds as they pass by sensor(s) 119. In the example shown in FIG. 3, seed sensor 119 is configured to sense seeds in seed delivery subsystem 116. However, seed sensors can be in seed metering subsystem 114 or in both subsystems 114 and 116 or elsewhere. The speeds of motors 115 and 117 can be varied to vary the spacing between the seeds, or the location of the seeds, in the furrow.

Row unit 106 can also include an additional hopper (not shown). The additional hopper can be used to provide additional material, such as fertilizer or another chemical.

In operation, as row unit 106 moves in the direction generally indicated by arrow 128, row cleaner 118 generally cleans the row ahead of the opener 120 to remove debris, such as plant residue from the previous growing season, and the opener 120 opens a furrow in the soil. Gauge wheels 122 illustratively control a depth of the furrow by controlling a depth of engagement that opener 120 has with the soil. Seed is metered by seed metering subsystem 114 and delivered to the furrow by seed delivery subsystem 116. Closing wheels 124 close the trench over the seed. A downforce generator 131 can also be provided to controllably exert downforce to keep the row unit in desired engagement with the soil. Though not shown in FIG. 3, row unit 106 can include a substance delivery system that can deliver a variety of substances, such as fertilizer (e.g., liquid fertilizer, granular fertilizer, etc.), to the furrow before it is closed by closing wheels 124.

Row cleaner 118 can also have a height control system and a down force control system. The height control system and down force control system for row cleaner 118 are shown and described below with respect to FIG. 5.

As shown in FIG. 3, row unit 106 also includes image sensor 132 and supplemental lighting subsystem (e.g., illumination source) 134, mounted to frame 108. Image sensor 132 and/or illumination source 134 can be pivotally or otherwise adjustably mounted to row unit 106 such that the position and/or orientation of either or both of sensor 132 and illumination source 134 can be adjusted. For example, adjustment can be made by the operator or automatically by a control system and actuator to, for instance, change a point of view of image sensor 132, adjust the angle of illumination source 134, etc.

Though shown mounted to row unit 106 between opener 120 and closing wheels 124 it is to be understood that image sensor system 132 and illumination source 134 can be mounted to various locations on row unit 106. Furthermore, additional sensing systems can be mounted to various locations on row unit 106, agricultural machine 100 and/or the towing vehicle. For instance, a first sensor system can be placed in front of opener 120, a second sensor system can be placed as shown in FIG. 3, and a third sensor system can be placed behind closing wheels 124. Additionally, it is to be understood that row unit 106, agricultural machine 100 and/or the towing vehicle can include various other sensors, as will be discussed further below. It is noted that these are just examples, and numerous other arrangements are contemplated herein. Additionally, it should be understood that each row unit 106 on planter 101 can include a respective image sensor system 132 and illumination source 134.

Figure 4:
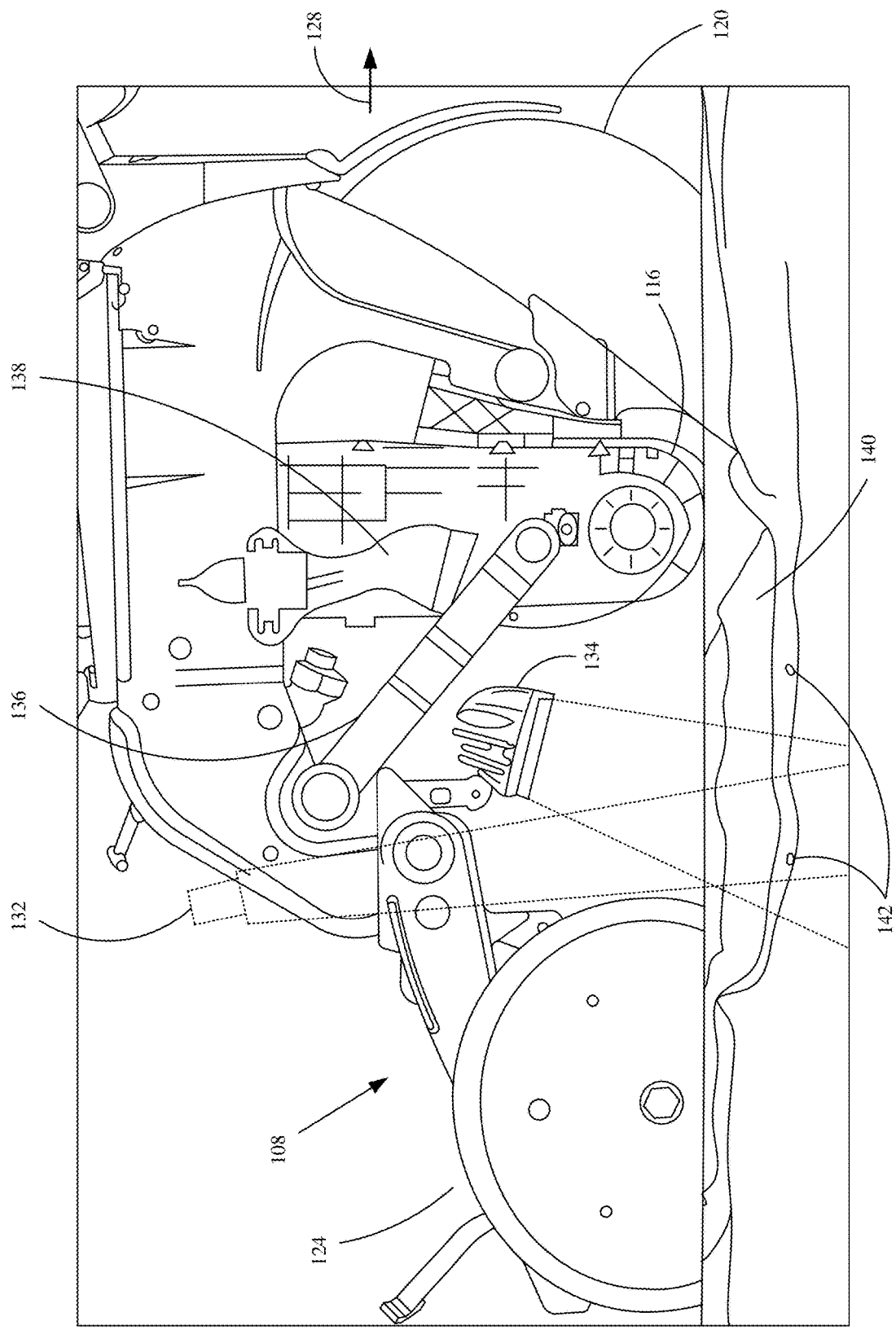
FIG. 4 shows one example of a side view of a furrow sensing system of a row unit on an agricultural machine.

FIG. 4 is a side view showing one example of an image sensor 132 and illumination source 134 in more detail. FIG. 4 also has gauge wheel 122 removed to show gauge wheel arm 136, arm contact member 138, furrow 140 and seed(s) 142. As can be seen, as row unit 106 travels over the agricultural surface in the direction of travel as indicated by 128, row cleaners 118 remove residue, opener 120 opens furrow 140, into which seed(s) 142 are placed, and soil is placed over seeds 142 by closing wheels 124. Gauge wheel arm 136 is mounted (e.g., pivotally mounted) to frame 108 and gauge wheel 122 (not shown in FIG. 4). The position of gauge wheel arm 136 controls the position of gauge wheel 122 which in turn controls a depth of furrow 140 by controlling a depth of engagement of opener 120 with the agricultural surface (e.g., the depth of engagement into the soil). The position of gauge wheel arm 136 is controlled by the position of arm contact member 138 which can be controlled manually by an operator, and/or automatically, such as by a control system and corresponding actuator.

Illumination source 134 illuminates an area proximate the furrow and image sensor 132 detects an image indicative of characteristics relative to the residue and seeds in furrow 140 and on the agricultural surface and generates an image signal indicative of the image. Illumination system 134 provides illumination to enhance visibility of furrow 140 by image sensor 132. In one example, image sensor 132 is an optical sensor, such as a visible light camera or a multi-spectral camera that captures an image of furrow 140 and the surrounding agricultural surface, though image sensor 132 can include any number of other image sensors, as well.

The characteristics detected by sensor 132 can include, but are not limited to, seed depth, furrow depth, seed orientation, seed position, furrow shape, furrow width, seed location, seed count, residue location, residue level, residue distribution, residue position, residue spacing, residue sizing, residue cover percentage (the percentage of the agricultural surface covered by residue), seed spacing, seed distribution, seed centering, substance (e.g., fertilizer) application, seed to soil contact, as well as a variety of other characteristics. Additional image sensors 132 and illumination sources 134 can be placed behind closing wheels 124 and/or in front of opener 120 to, for example, provide closed loop control, detect characteristics relative to residue on the agricultural surface prior to opening of the furrow, detect characteristics relative to residue on the closed furrow, as well as a variety of other characteristics.

The sensor signals (e.g., image(s)) generated by image sensor 132 can be processed to extract the various characteristics (e.g., as values), using any number of suitable techniques, including, but not limited to, contrast enhancement, segmentation, thresholding, color modeling (e.g., RGB), edge detection, black/white analysis, machine learning, neural network processing, pixel testing, pixel clustering, shape detection, as well as various other techniques. These extracted values can then be used, such as by aggregation or other algorithmic data processing, to determine a number of different metrics indicative of an impact of the residue on seed development. This metric can be stored and/or displayed in numerous ways to the operator, including in a time history distribution. Additionally, or alternatively, this metric can be used to control the operation of the agricultural machine 100. The various operations and control of agricultural machine 100 can include controlling the row cleaner 118 (such as the height and down force of row cleaner 118), seed placement in furrow 140, the application of substances to the field, among other things. Some examples of control of the agricultural machine 100 are discussed in greater detail herein.

Figure 5:
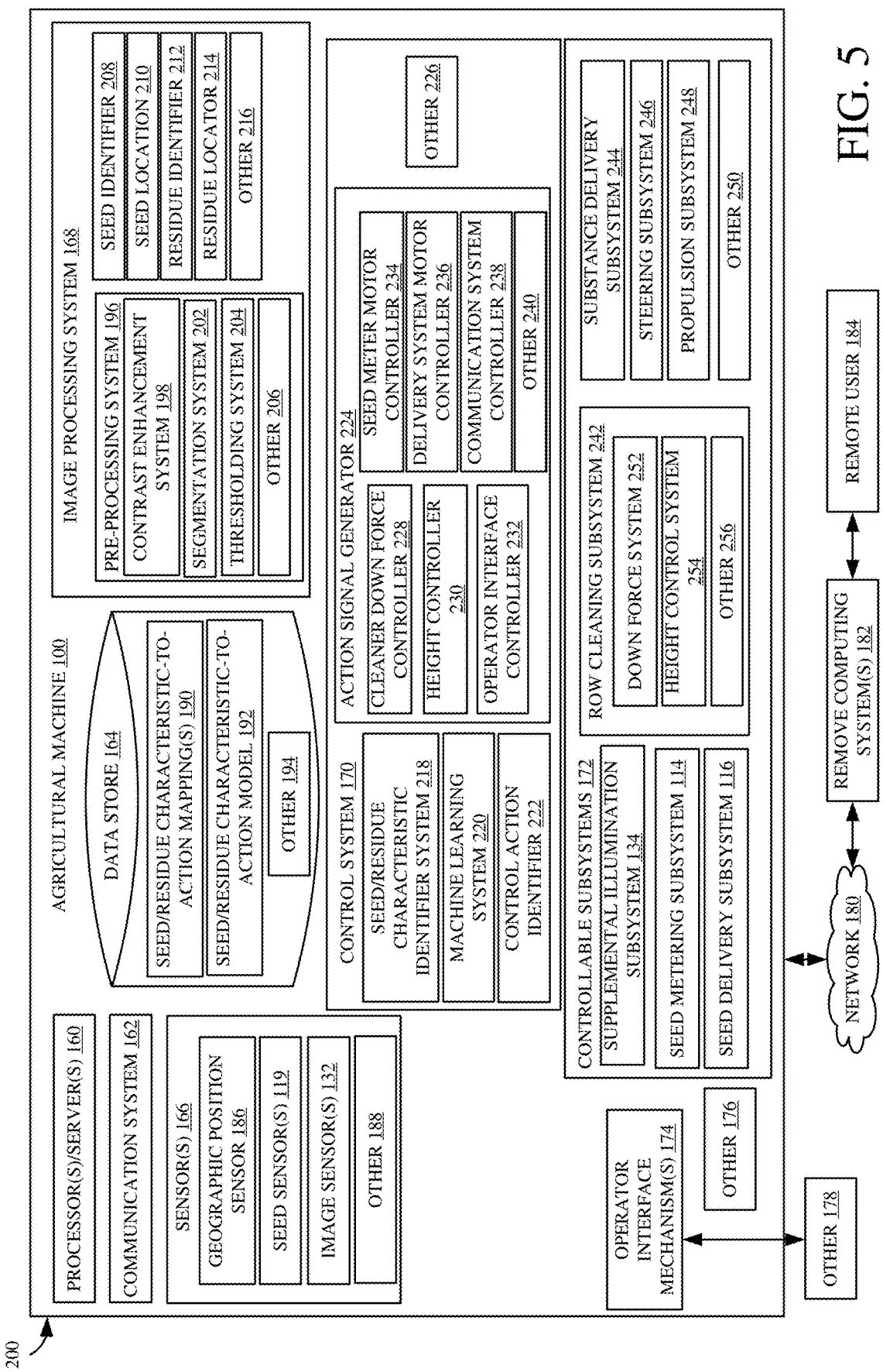
FIG. 5 is a block diagram of one example of an agricultural machine architecture.

FIG. 5 is a block diagram of one example of an agricultural machine architecture 200 having an agricultural machine 100 configured to perform a planting operation on an agricultural surface, such as a field. Some items are similar to those shown in previous FIGS. and they are similarly numbered. It will be noted that the items shown on agricultural machine 100 in FIG. 5 can be on planter 101 or towing vehicle 103, or distributed with some items on planter 101 and some on towing vehicle 103, or elsewhere. They are shown together on machine 100 for the sake of example only.

FIG. 5 shows that agricultural machine 100 can include one or more processors or servers 160, communication system 162, data store 164, one or more sensors 166, image processing system 168, control system 170, controllable subsystem 172, operator interface mechanisms 174, and other items 176. An operator 178 can interact with operator interface mechanisms 174 to control and manipulate agricultural machine 100. Therefore, operator interface mechanisms 174 can include pedals, steering wheel, joysticks, linkages, levers, buttons, a display device, a touch sensitive display device, or any of a wide variety of different visual, audible and haptic mechanisms.

FIG. 5 also shows that agricultural machine 100 can communicate over a network 180 with one or more remote computing systems 182 that can be accessed by remote users 184. Therefore, network 180 can be a wide area network, a local area network, a near field communication network, a cellular communication network, or any of a wide variety of different types of networks or combinations of networks. Communication system 162 can facilitate the communication of items on agricultural machine 100 with one another, and can also facilitate communication over network 180. Therefore, communication system 162 can include any of a variety of different items, such as a controller area network (CAN) bus along with CAN bus control circuitry, or other communication systems that are used to communicate within agricultural machine 100 or over network 180.

In the example shown in FIG. 5, sensors 166 can include one or more geographic position sensors 186. Sensors 186 can be disposed on individual row units 106 or at other places on agricultural machine 100. Geographic position sensors 186 can include such things as a Global Navigation Satellite System (GNSS) receiver, a cellular triangulation sensor, a dead reckoning system, among others. Seed sensors 119 can be any of a wide variety of seed sensors that sense the seed presence in metering subsystem 114 and/or seed delivery subsystem 116. Examples of different image sensors 132 are described above. Sensors 166 can also include a wide variety of other sensors 188.

Data store 164 can include seed/residue characteristic-to-action mappings 190, seed/residue characteristic-to-action model 192, and data store 164 can store other items 194. Image processing system 168 can include pre-processing system 196 which, itself, can include contrast enhancement system 198, segmentation system 202, thresholding system 204, and other items 206. Image processing system 168 can also include seed identifier 208, seed locator 210, residue identifier 212, residue locator 214 and other items 216. Control system 170 includes seed/residue characteristic identifier system 218, machine learning system 220, control action identifier 222, action signal generator 224, and other items 226. Action signal generator 224 can include cleaner downforce controller 228, height controller 230, operator interface controller 232, seed meter motor controller 234, delivery system motor controller 236, communication system controller 238, and other items 240. Controllable subsystems 172 include supplemental illumination subsystem 134, row cleaning subsystem 242, seed metering subsystem 114, seed delivery subsystem 116, substance delivery subsystem 244, steering subsystem 246, propulsion subsystem 248, and other items 250. Row cleaning subsystem 242 can, itself, include downforce system 252, height control system 254, and other items 256.

Before describing the overall operation of architecture machine 100 in more detail, a brief description of some of the items in machine 100, and their operation, will now be provided. Image processing system 168 receives images from image sensors 132 and processes them to identify certain characteristics in the images. Pre-processing system 196 pre-processes the image. A variety of different techniques can be used to pre-process the image. For instance, contrast enhancement system 198 can enhance the image contrast. Segmentation system 202 can segment the image based upon colors or in other ways. Thresholding system 204 can be used to pre-process the image as well. Seed identifier 208 identifies seeds within the image and seed locator 210 locates the seeds (e.g., locate the seeds within the image and identifies a geographic location of the seeds on the ground) based upon the location of the seeds within the image, and based upon a sensor signal from a geographic position sensor 186. Residue identifier 212 identifies residue in the image and residue locator 214 locates the residue. The seed identifier 208, seed locator 210, residue identifier 212 and residue locator 214 can be implemented using any of a wide variety of different types of image processing techniques. Such techniques can include artificial neural networks, Bayesian networks, machine learned models, and other implementations.

Based upon the seeds identified in the images and their location, as well as the residue identified in the images, and the residue location, control system 170 can identify seed and residue characteristics and generate action signals to carry out actions based upon the identified characteristics. Seed/residue characteristic identifier system 218 identifies the seed/residue characteristics from the seeds and seed locations and residue and residue locations identified by image processing system 168. The seed/residue characteristic identifier system can identify a wide variety of different types of characteristics, the residue distribution both on the surface of the field and throughout a top pre-defined number of inches or centimeters (such as the top two inches) of the soil, the separation between seeds and residue, a correlation of the seed and residue distributions, and other characteristics. The characteristic(s) can be used to quantify the impact of residue on the seed development, among other characteristics. Again, system 218 can be implemented as an artificial neural network, a Bayesian network, a characteristic identification model, or any of a wide variety of different types of systems.

Machine learning system 220 can be used to perform machine learning on system 218 to improve its operation in identifying seed/residue characteristics. The machine learning can be performed based on user inputs as described below, or in other ways.

Control action identifier 222 then identifies the control action to take based upon the identified seed/residue characteristics. In order to do so, control action identifier 222 can access the characteristic-to-action mappings 190 and/or the characteristic-to-action model in data store 164. Mappings 190 may map the identified seed/residue characteristics to one or more actions that are to be taken in response to those characteristics. For instance, if the residue distribution is too heavy, then the level of residue indicated by the residue distribution may be mapped to a control action to increase the down pressure on row cleaner 118. This is just one example of a mapping and others are described below.

Model 192 may receive, as an input, the identified seed/residue characteristics and generate, as an output, an action indicator identifying actions to be taken. Based upon the identified action, action signal generator 224 generates an action signal to perform the identified action.

Cleaner downforce controller 228 controls the downforce system 252 in row cleaning subsystem 244 to control the downforce on the row cleaners 118. Height controller 230 generates control signals to control the height control system 254 of row cleaning subsystem 242 in order to change the height of row cleaner 118 relative to the frame of row unit 106 or the ground. Operator interface controller 232 can control operator interface mechanisms 174 to generate outputs for operator 178. The outputs may identify the seed/residue characteristics, the action to be taken in response to those characteristics, and/or other information. Communication system controller 238 can generate control signals to control communication system 162 to communicate with remote computer systems 182 over network 180, based upon the seed/residue characteristics and the control actions identified. Seed meter motor controller 234 can generate control signals to control the meter motor 115 in seed metering subsystem 114 to adjust the position of the seed in furrow 140, based upon the seed/residue characteristics. For instance, the speed of the meter motor 115 can be varied so that the seed is placed in the furrow between pieces of residue, or at a position where the seed development will be less affected than at other positions.

Delivery system motor controller 236 can control delivery motor 117 to vary the speed of seed delivery subsystem 116. This variation can be performed to adjust the location at which the seed is deposited into the furrow 140, again based upon the residue located or residue distribution, or other seed/residue characteristics.

Control system 170 can also generate control system signals to control substance delivery subsystem 244 in order to control the delivery of other substances (such as fertilizer, herbicides, or chemicals that increase the speed at which residue deteriorates) into the furrow or elsewhere in the field. Control system 170 can also generate control signals to control steering subsystem 246 to guide the heading of agricultural machine 100. Control system 170 can also control propulsion subsystem 248 to control the propulsion speed of agricultural machine 100. These are just examples of how control system 170 can control agricultural machine 100 based upon the identified seed/residue characteristics.

Figure 6:
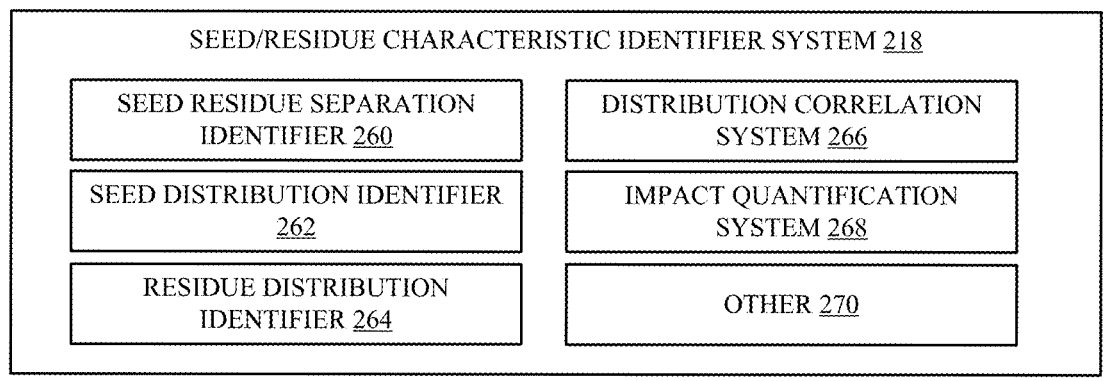
FIG. 6 is a block diagram of one example of a seed/residue characteristic identifier system.

FIG. 6 is a block diagram showing one example of seed/residue characteristic identifier system 218. System 218 illustratively includes seed/residue separation identifier 260, seed distribution identifier 262, residue distribution identifier 264, distribution correlation system 266, impact quantification system 268, and other items 270. Seed/residue separation identifier 260 obtains the locations of the seeds and residue particles from seed locator 210 and residue locator 214 and generates a separation indicator indicating the separation between the seeds and residue. In one example, the separation indicator may identify an average separation distance by which seed is separated from its closest residue particle. In another example, seed/residue separation identifier 260 generates indicators that indicate a level of residue coverage within a given separation distance of seeds. In another example, seed/residue separation identifier 260 generates an indicator that indicates how far the seeds are separated from residue in the vertical direction, such as by considering the location of residue in the top two inches of soil in the furrow and the location of the seed in the furrow. These are only examples of separation indicators that can be generated by seed/residue separation identifier 260. These and/or other indicators can be generated as well.

Seed distribution identifier 262 generates a seed distribution output indicative of a distribution of seeds within the furrow. The seed distribution output may identify average seed separation, or a different representative of the separation or distribution if seeds within the furrow. Similarly, the distributions of seeds in multiple furrows across the planter can be combined or aggregated into an aggregate seed distribution indicator that indicates the aggregate distribution of seeds across the planter.

Residue distribution identifier 264 generates a residue distribution indicator indicating the distribution of residue. The residue distribution indicator may be similar to the seed distribution output. For instance, reside distribution identifier 264 can generate an output indicative of the average spacing of residue, the aggregate coverage of residue over a predetermined area, the size of residue particles, the location of residue particles in the top predetermined number of inches or centimeters of soil, or other residue distribution indicators.

Distribution correlation system 266 correlates the seed distribution generated by seed distribution identifier 262 and the residue distribution identified by residue distribution identifier 264. For example, where the residue distribution identifier 264 identifies the separation between particles of residue along different axes in the field, or in the furrow, and where seed distribution identifier 262 identifies the spacing among seeds, the two distributions can be correlated to identifying a representative separation or correspondence between the particles of residue and the seeds. Other correlations can be identified as well.

Based upon the seed/residue separation, the seed distribution, the residue distribution, and/or the correlated distributions, impact quantification system 268 generates a quantity indicator that quantifies the impact that the residue is likely to have on the development of the seeds. Impact quantification system 268 may be implemented as an artificial neural network, a quantification model that accepts as inputs the output indicators from identifiers 260, 262, and 264, and from distribution correlation system 266 and generates a quantification output. The quantification output may be an identifier that identifies a level of impact (such as a numerical indicator ranging over a pre-defined range such as 1-10), or a more elaborate quantification identifier which identifies the impact of the residue on different aspects of the development of the seed (such as the affect on germination, emergence, post-emergence development, etc.).

Impact quantification system 268, as well as the other items in seed/residue characteristic identifier system 218 can be implemented as using a neural network, a Bayesian network, a different type of classifier, a model, or in another way. The implementations of seed/residue characteristic identifier system 218 can be generated and/or trained using machine learning or in other ways.

Figure 7A:
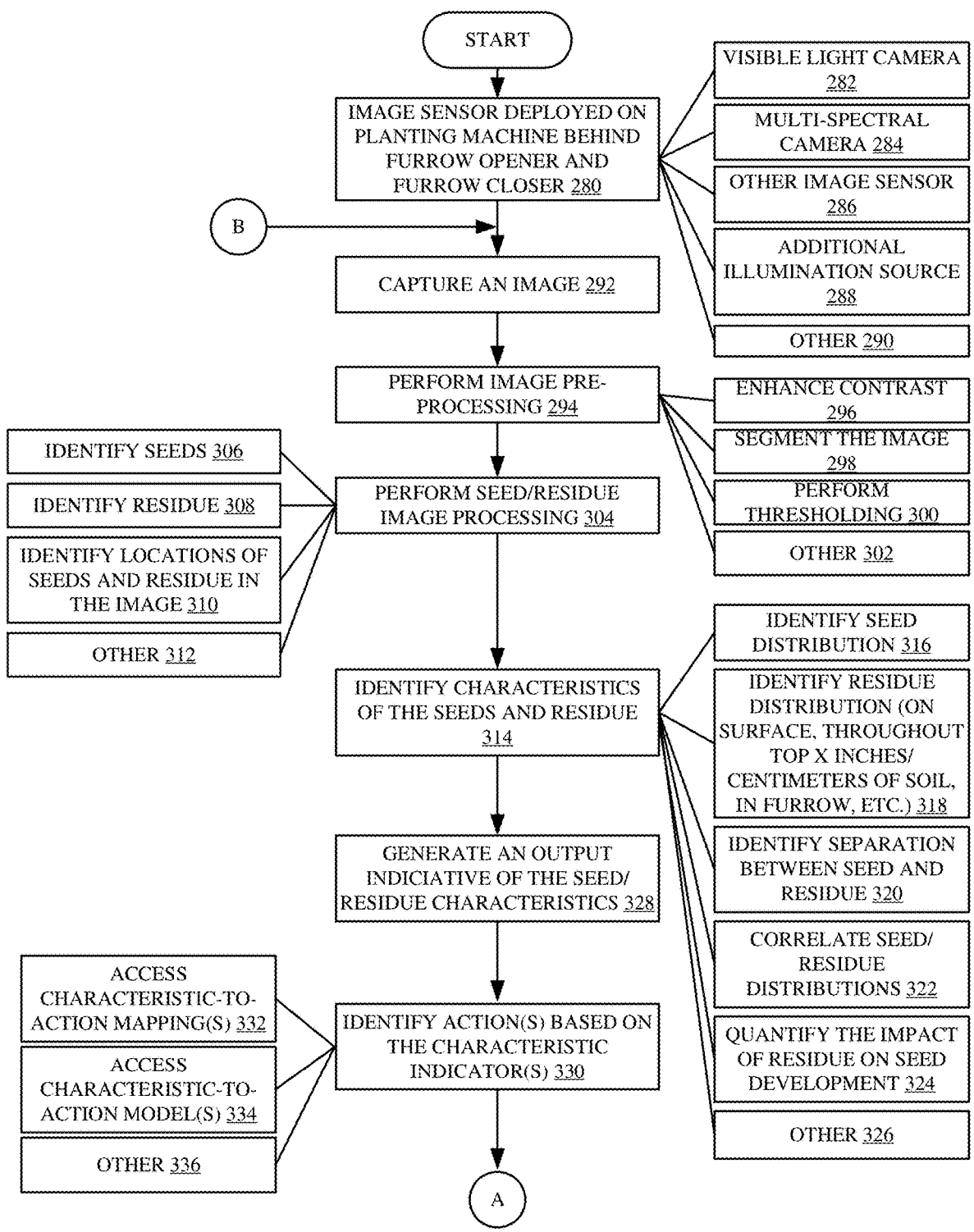
FIGS. 7A and 7B (collectively referred to herein as FIG. 7) are flow diagrams showing example operations of the agricultural machine.
Figure 7B:
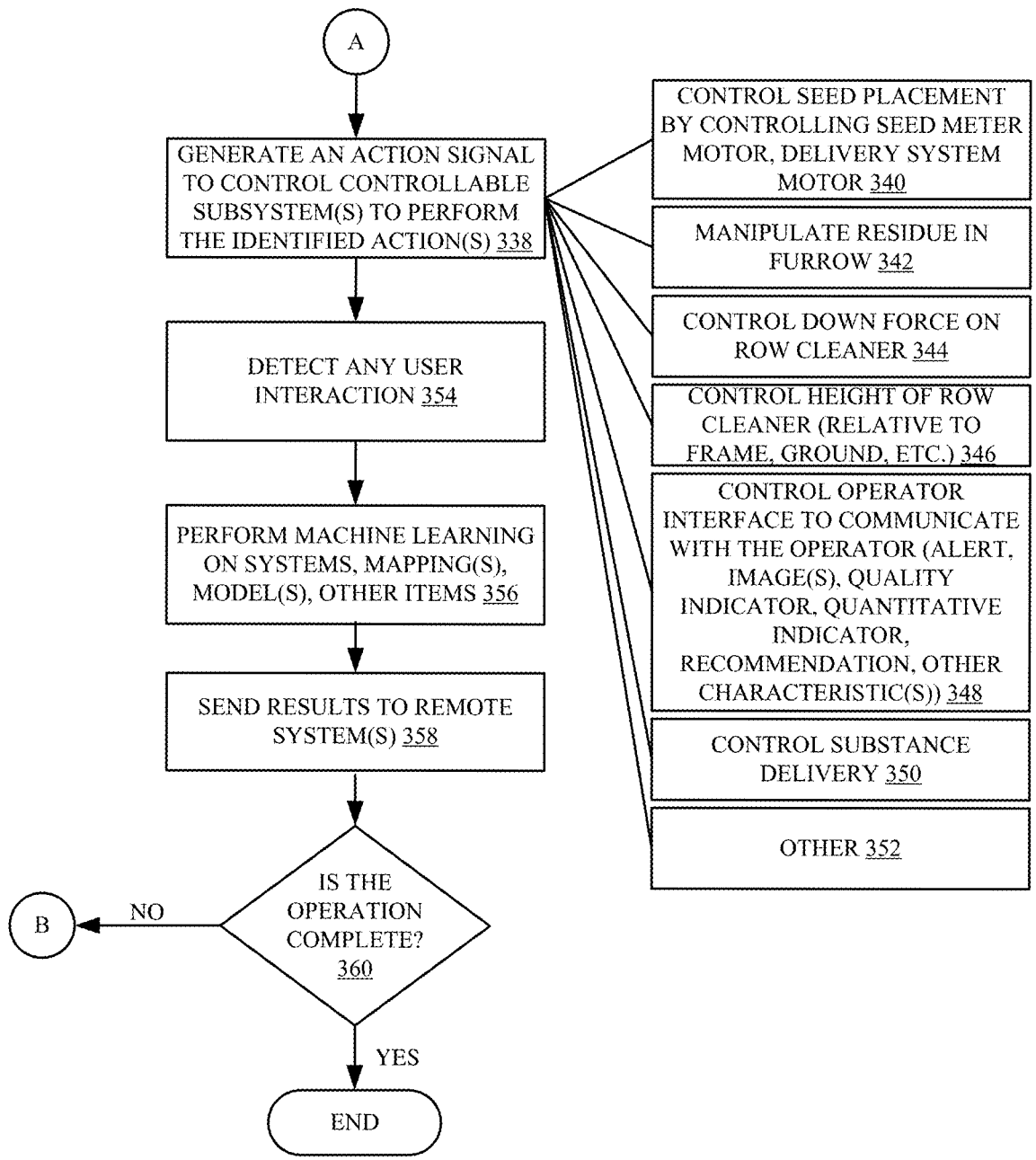

FIGS. 7A and 7B (collectively referred to herein as FIG. 7) show one example of a flow diagram illustrating the operation of agricultural machine 100, in identifying seed/residue characteristics and generating action signals to perform actions based upon the identified seed/residue characteristics. In one example, one or more image sensors 132 are deployed on planting machines. In one example, the image sensors are deployed behind the furrow opener 118 and ahead of the furrow closer 124. Deploying the image sensors in this way is indicated by block 280 in the flow diagram of FIG. 7. In one example, the image sensor 132 includes a visible light camera 282. In another example, the image sensor 132 includes a multi-spectral camera 284 or another image sensor 286. Also, in one example, the supplemental illumination system 134 is provided as an additional light source 288 on the planter. The image sensors 132 can be deployed in other ways as well, as indicated by block 290.

The present discussion will proceed with respect to a single image sensor 132 capturing an image. However, it will be noted that similar processing can be performed where multiple image sensors 132 are capturing multiple images (e.g., ahead of the opener 118 and/or behind the closer 124, and across several rows or row units 106).

Image sensor 132 illustratively captures an image, as indicated by block 292 in the flow diagram of FIG. 7. The image, or a representation of the image, is provided by sensor 132 to image processing system 268 where pre-processing system 196 performs image pre-processing on the captured image. Performing pre-processing is indicated by block 294 in the flow diagram of FIG. 7. The image pre-processing can take a variety of different forms. Contrast enhancement system 198 can perform contrast enhancement, as indicated by block 296. Segmentation system 202 can perform image segmentation, as indicated by block 298. Thresholding system 204 can perform thresholding, as indicated by block 300, and other items 206 can perform other types of pre-processing, as indicated by block 302.

Image processing system 168 then performs image processing with respect to the seed and residue in the image, as indicated by block 304. Seed identifier 208 can identify seeds in the image, as indicated by block 306. Residue identifier 212 can identify residue particles in the image, as indicated by block 308. Seed locator 210 and residue locator 214 identify the locations of seeds and residue particles in the image, as indicated by block 310. The seed and residue locations can be relative locations, such as the seed locations relative to the residue particle locations, or they can be absolute locations, such as geographic positions of the seed and residue in the field. Identifying an absolute location can be done by correlating the geographic position sensor signal from geographic position sensor 186, to the image that is captured from the field, and to thus derive the location of items within the image. In one example, the locations of the seeds and residue particles identified in the image are located within the image and the relative location of each seed, relative to each of the identified residue particles, and the relative location of each residue particle, relative to each seed, is identified. The seed/residue image processing can be performed in other ways as well, as indicated by block 312.

Seed/residue characteristic identifier system 218 then identifies characteristics of the seeds and residue, based upon the outputs from image processing system 168 (such as the seeds identified and located as well as the residue particles identified and located). Identifying characteristics of the seeds and residue is indicated by block 314 in the flow diagram of FIG. 7. Seed distribution identifier 262 can identify the seed distribution in the image, as indicated by block 316. Residue distribution identifier 264 can identify the distribution of residue particles within the image, on the surface, in the furrow, and/or throughout the top X number of inches or centimeters of soil (e.g., the top 2 inches), as indicated by block 318. Seed/residue separation identifier 260 can identify the separation between the seeds and residue particles in the image, as indicated by block 320. Distribution correlation system 266 can correlate the seed and residue distributions and locations, as indicated by block 322. Impact quantification system 268 then generates an output quantifying the impact of the residue particles on seed development, as indicated by block 324. The characteristics of the seeds and residue particles in the image can be identified in other ways, across images, through aggregations, or in other ways, as indicated by block 326.

Seed/residue characteristic identifier system 218 generates an output indicative of the seed/residue characteristics, as indicated by block 328 in the flow diagram of FIG. 7. Based upon the seed/residue characteristics, control action identifier 222 identifies actions to be taken based upon those characteristics, as indicated by block 330. Control action identifier 222 can access data store 164, based upon the identified seed/residue characteristics. For instance, control action identifier 222 can access seed/residue characteristic-to-action mappings 190 which map different seed/residue characteristics to actions that are to be taken. Accessing the characteristic-to-action mappings 190 is indicated by block 332 in the flow diagram of FIG. 7.

In another example, control action identifier 222 can access a seed/residue characteristic-to-action model 192 that takes, as an input, the identified seed/residue characteristics and generates, as an output, an action indicator identifying an action to be taken in response to the identified seed/residue characteristics. Accessing a characteristic-to-action model is indicated by block 334 in the flow diagram of FIG. 7. Control action identifier 222 can identify actions to take, based upon the seed/residue characteristics, as well as others, as indicated by block 336.

Action signal generator 224 then generates an action signal to control a controllable subsystem 172 or another item on agricultural machine 100 to perform the identified action that was identified by control action identifier 222. Generating an action signal to control a controllable subsystem to perform the identified action is indicated by block 338 in the flow diagram of FIG. 7.

The actions to be performed can be any of a variety of different actions based upon the seed/residue characteristics identified, based upon the particular machines being used, based upon weather conditions, or based upon the quantified impact of the residue on seed development, and/or based upon a wide variety of other criteria. For example, seed meter motor controller 234 and/or delivery system motor controller 236 can generate control signals to control meter motor 115 and/or delivery motor 117 to control the placement of seed in the furrow, relative to identified residue particles. As an example, the residue particles can be identified in or near the furrow prior to the seed being placed in the furrow, and motors 115 and 117 can be controlled to expedite seed delivery or delay seed delivery, in order to deliver the seed earlier or later in the furrow, at a position that avoids close proximity to identified residue particles. Controlling seed placement by controlling seed meter motor 115 and/or delivery system motor 117 is indicated by block 340 in the flow diagram of FIG. 7.

In another example, action signal generator 224 can generate an action signal to control a residue manipulator that manipulates residue within the furrow, such as a residue clearing mechanism or another manipulator. Generating a control signal to manipulate residue in the furrow is indicated by block 342 in the flow diagram of FIG. 7.

When a downforce system 252 is deployed to control the downforce on cleaning system 118, cleaner downforce controller 228 can generate control signals to control the downforce generated by downforce system 252. Controlling the cleaner downforce is indicated by block 344 in the flow diagram of FIG. 7.

Height controller 230 can also generate control signals to control height control system 254 which, in turn, controls the height of cleaning system 118 relative to the frame of the row unit or relative to the ground or relative to another point. Controlling the height of the row cleaner relative to the frame, relative to the ground, etc., is indicated by block 346 in the flow diagram of FIG. 7.

In another example, operator interface controller 232 controls operator interface mechanisms 174 to communicate with operator 178. The communication can be in the form of an alert, a representative image showing residue and seed, a qualitative or quantitative indicator showing the quality of the seed/residue characteristics or the quantification of the impact that the residue particles will have on seed development, recommendations based on identified seed/residue characteristics, or other things. The communications to the operator may also indicate automatic control actions that have been automatically performed in response to the seed/residue characteristics. For instance, the communication may be an indication to operator 178 that indicates that the height or downforce on row cleaner 118 has been adjusted. Controlling the operator interface mechanisms 174 to communicate with operator 178 is indicated by block 348 in the flow diagram of FIG. 7.

Where the agricultural machine 100 is implemented with a substance delivery subsystem 244 that delivers another subsystem, action signal generator 224 can generate control signals to control subsystem 244 to control substance delivery (such as to control the delivery of fertilizer, herbicide, a chemical that enhances residue deterioration, and/or other substances). Generating control signals to control substance delivery is indicated by block 350 in the flow diagram of FIG. 7. Other action signals can be generated to control other controllable subsystems as well, as indicated by block 352.

At some point, it may be that operator 178 provides an input that can be used by machine learning system 220 to perform machine learning on any of the items in image processing system 168, data store 164, or control system 170. For instance, operator 178 may reverse the action or amplify the action that was automatically taken. Similarly, operator 178 may take a recommended action that is recommended by the control system 170 through an operator interface message or dismiss that recommendation. All of this information can be detected by user interface mechanisms 174 and provided to machine learning system 220. Detecting any user interactions is indicated by block 354 in the flow diagram of FIG. 7 and performing machine learning is indicated by block 356.

Communication system controller 232 can also control communication system 162 to transmit any desired information about the seed/residue characteristics, the actions taken, the control signals generated, etc., to remote computing systems 182 over network 180. Sending results to the remote computing systems 182 is indicated by block 358 in the flow diagram of FIG. 7.

Capturing images, processing them, and generating control signals can be continued until the operation being performed by agricultural machine 100 is complete. Continuing the processing until the operation is complete is indicated by block 360 in the flow diagram of FIG. 7.

It can thus be seen that the present description identifies characteristics of seed and residue in images and uses those characteristics to quantify the impact of residue on seed development. The present description also generates control signals based upon the characteristics and quantified impact.

The present discussion has mentioned processors and servers. In one example, the processors and servers include computer processors with associated memory and timing circuitry, not separately shown. They are functional parts of the systems or devices to which they belong and are activated by and facilitate the functionality of the other components or items in those systems.

Figure 8:
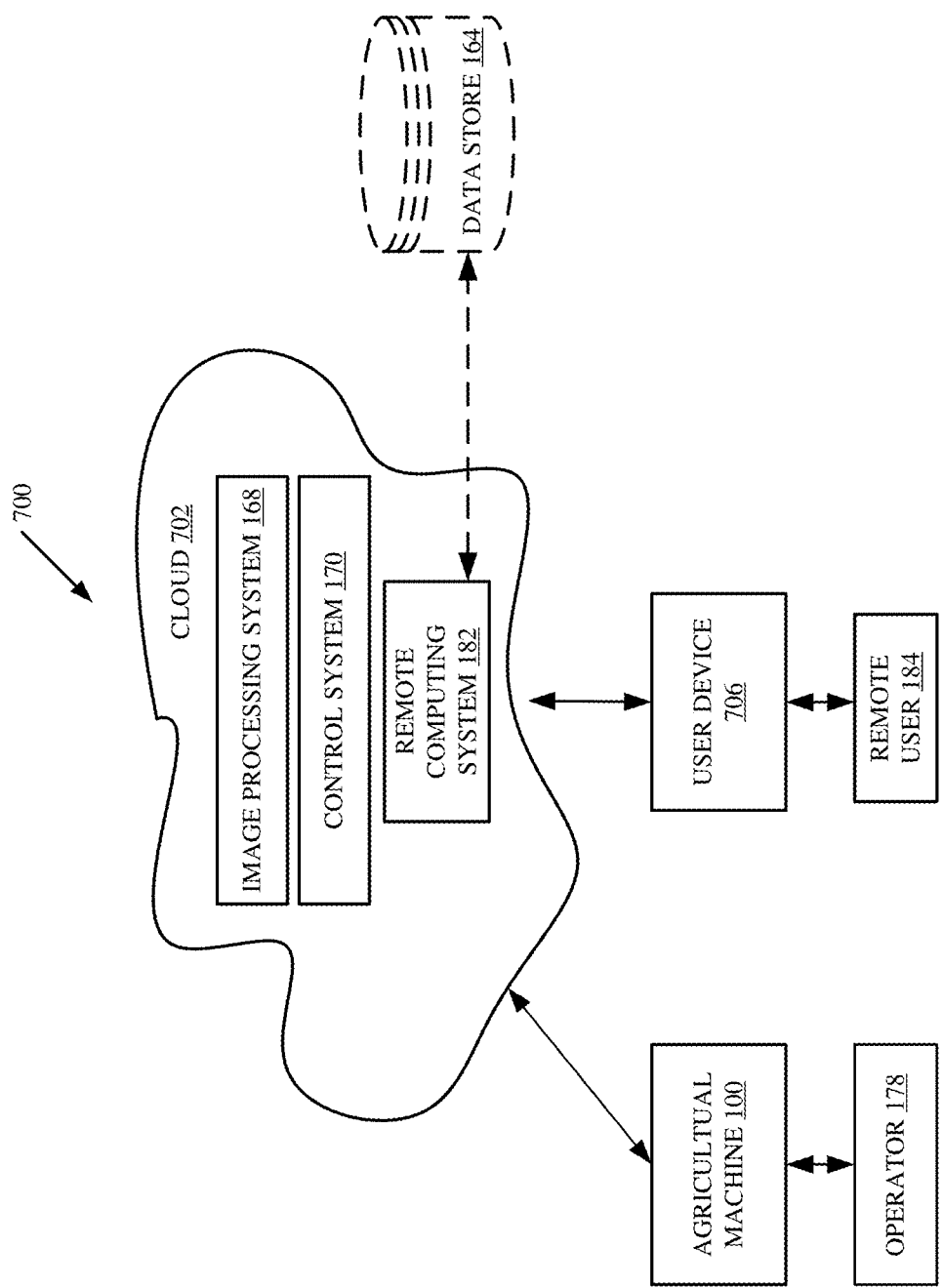
FIG. 8 is a block diagram showing the architecture illustrated in FIG. 5 deployed in a remote server architecture.

FIG. 8 is a block diagram of agricultural machine 100, shown in FIGS. 1-5, except that it communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1-5 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIG. 5 and they are similarly numbered. FIG. 8 specifically shows that remote computing system 182, image processing system 168, and/or control system 170 can be located at a remote server location 702. Therefore, agricultural machine 100 and operator 178 access those systems through remote server location 702.

FIG. 8 also depicts another example in which remote user 184 uses a user device 706 to access remote computing system(s) in remote server location 702. Also, FIG. 8 shows an example of a remote server architecture in which it is also contemplated that some elements of FIG. 5 are disposed at remote server location 702 while others are not. By way of example, data store 164, which can comprise a third-party system, can be disposed at a location separate from location 702 and accessed through the remote server at location 702. Regardless of where they are located, they can be accessed directly by agricultural machine 100 and/or operator 178, as well as by remote user 184 (via user device 706) through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine 100 comes close to the fuel truck for fueling, the system automatically collects the information from the agricultural machine 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine 100 until the agricultural machine 100 enters a covered location. The agricultural machine 100, itself, can then send the information to the main network.

It will also be noted that the elements of FIG. 5, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
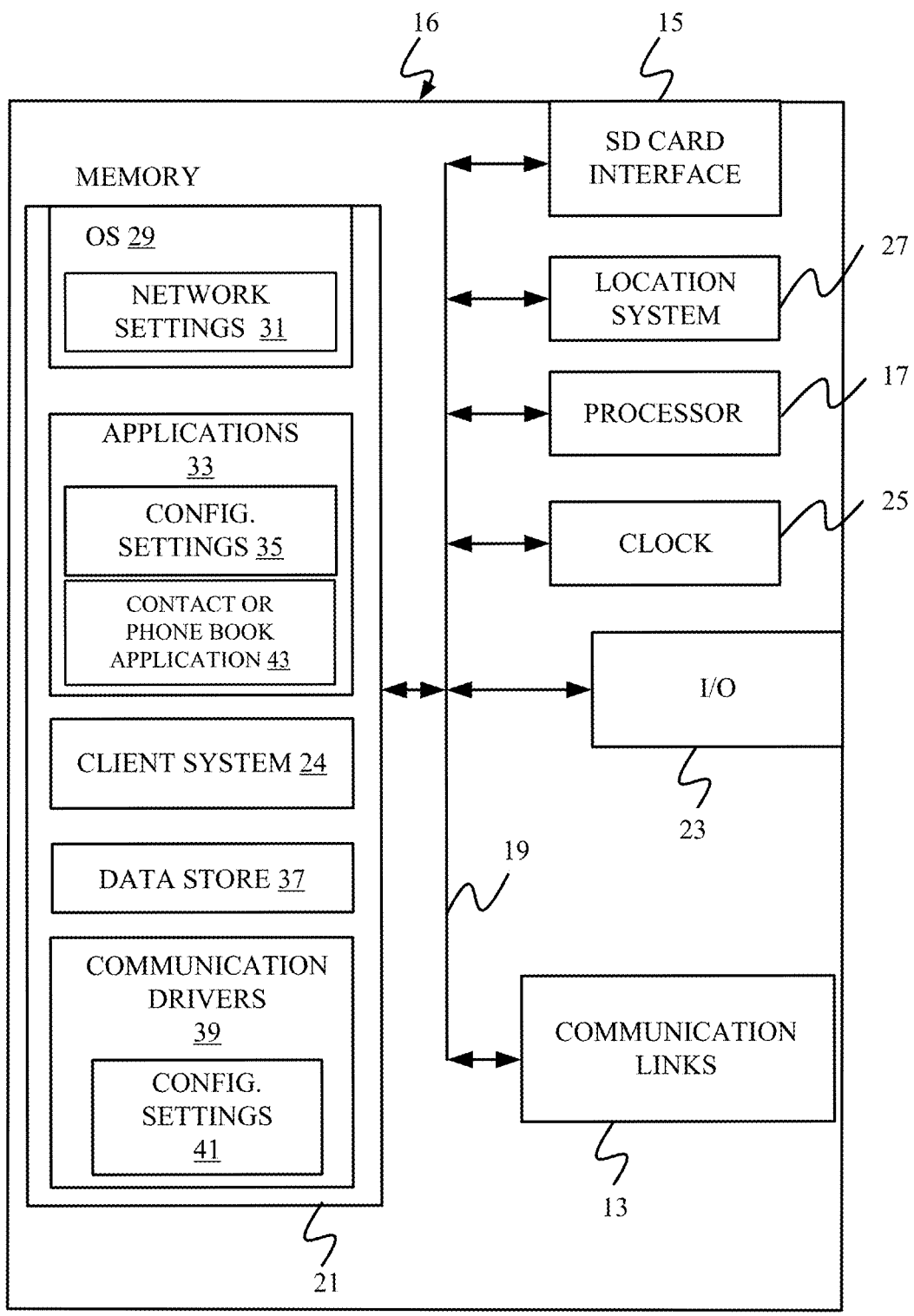
FIGS. 9-11 show examples of mobile devices that can be used in the architectures shown in the previous FIGS.
Figure 10:
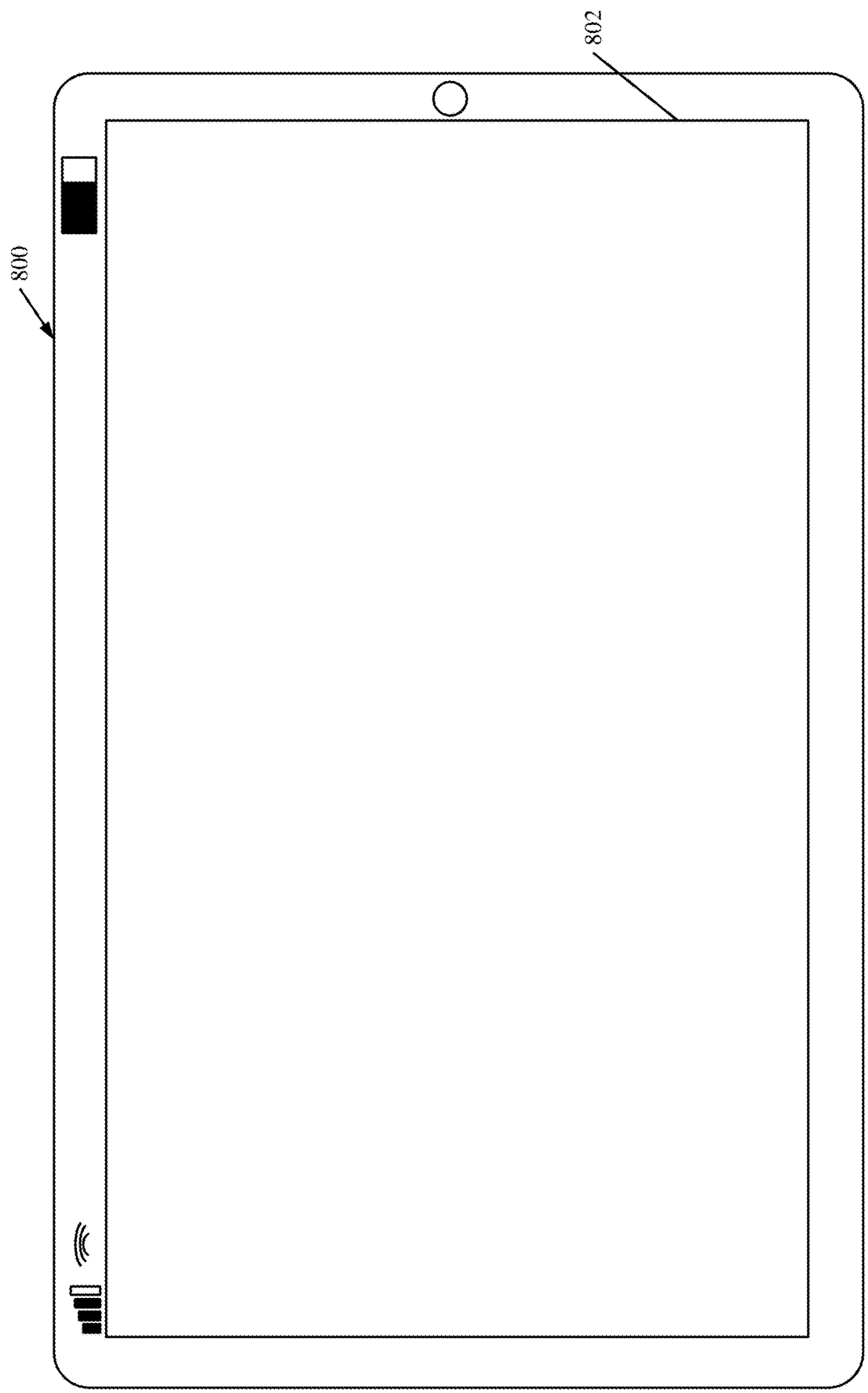
Figure 11:
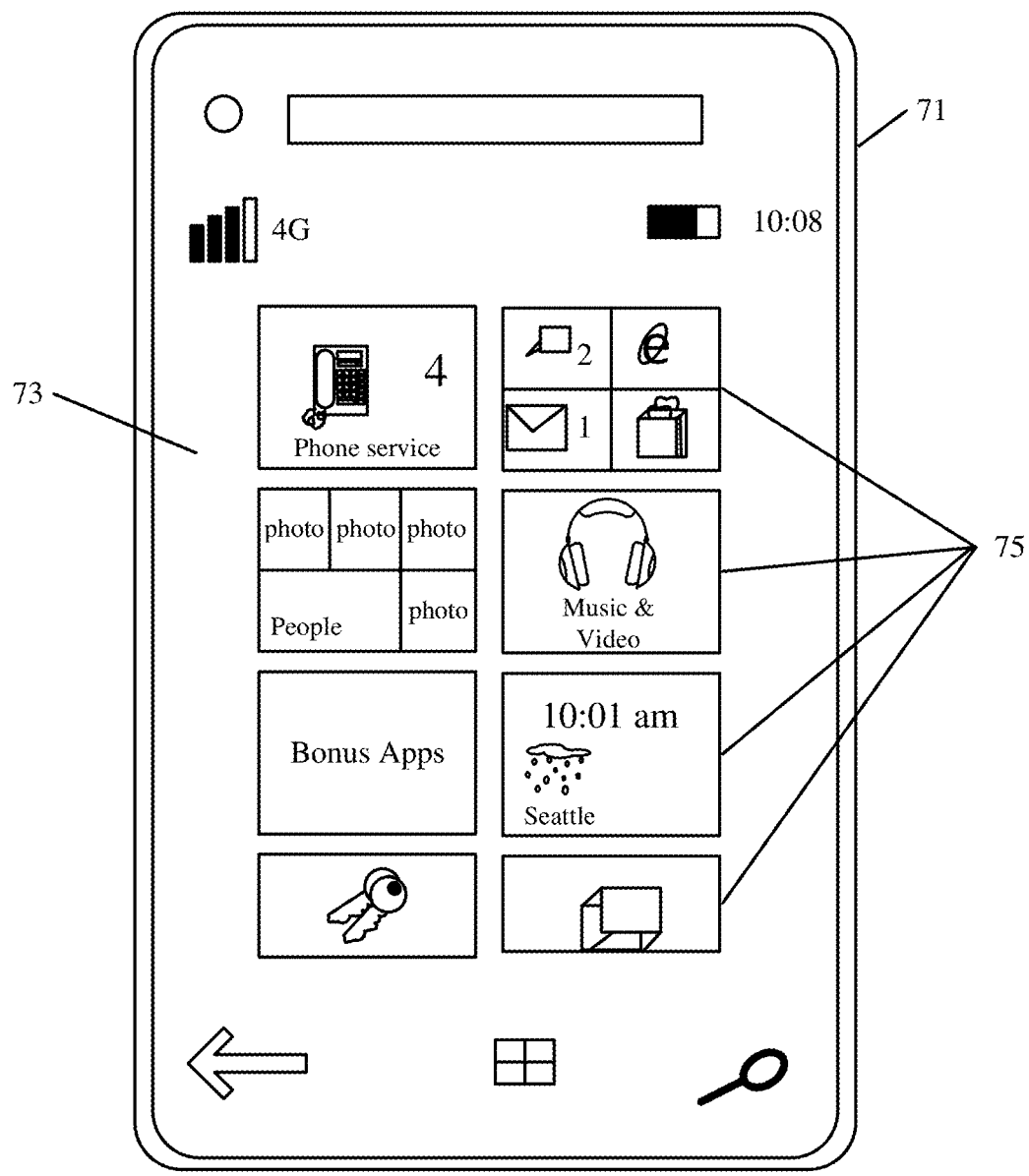

FIG. 9 is a simplified block diagram of one illustrative example of a handheld or mobile computing device that can be used as a user's or client's handheld device 16, in which the present system (or parts of it) can be deployed. For instance, a mobile device can be deployed in the operator compartment of agricultural machine 100 for use in generating, processing, or displaying data. FIGS. 10-11 are examples of handheld or mobile devices.

FIG. 9 provides a general block diagram of the components of a client device 16 that can run some components shown in FIG. 5, that interacts with them, or both. In the device 16, a communications link 13 is provided that allows the handheld device to communicate with other computing devices and in some examples provides a channel for receiving information automatically, such as by scanning. Examples of communications link 13 include allowing communication through one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor(s)/server(s) from FIG. 5) along a bus 19 that is also connected to memory 21 and input/output (I/O) components 23, as well as clock 25 and location system 27.

VO components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 800. In FIG. 10, computer 800 is shown with user interface display screen 802. Screen 802 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well.

FIG. 11 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
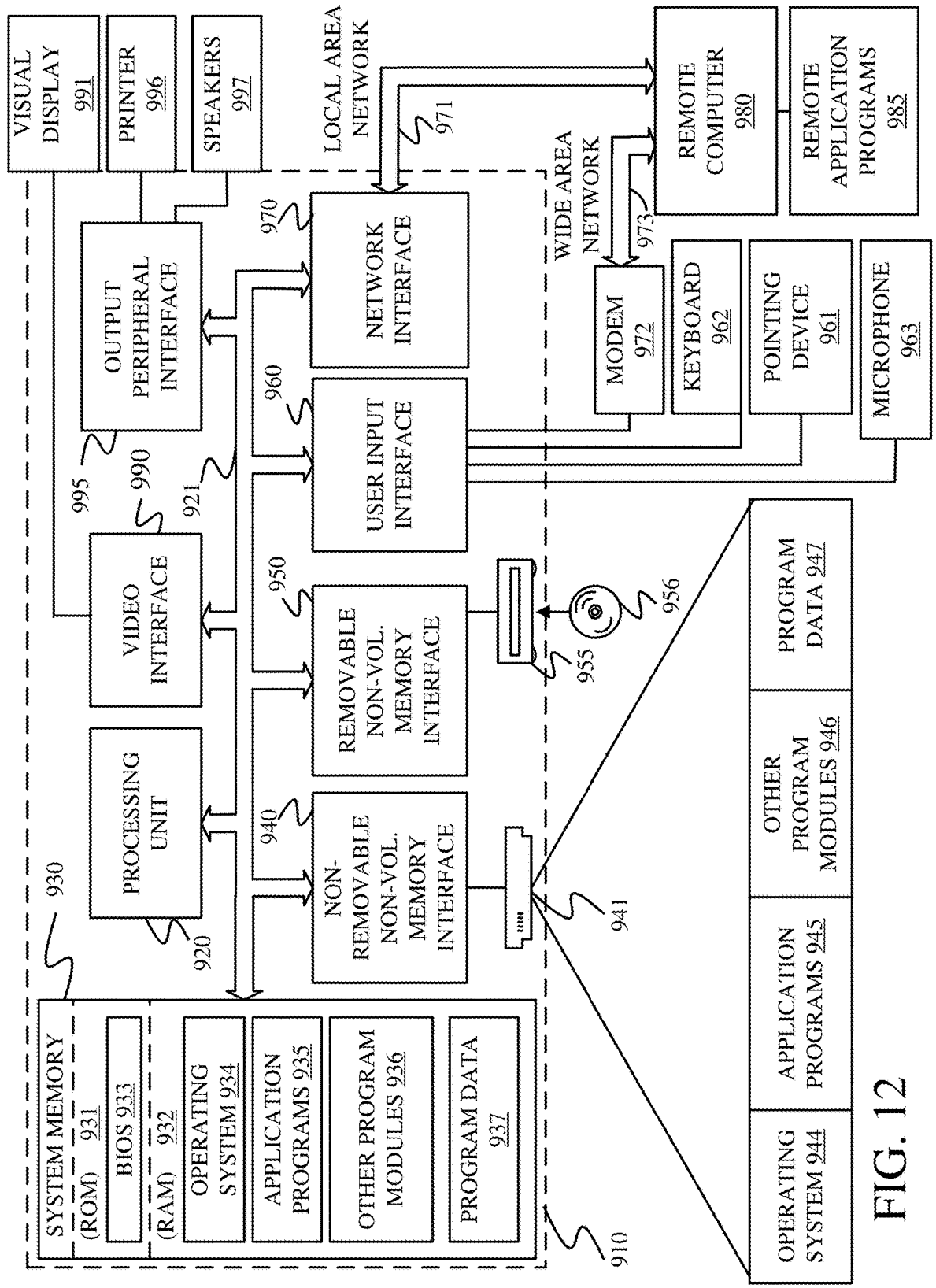
FIG. 12 is a block diagram showing one example of a computing environment that can be used in the architectures illustrated in previous FIGS.

FIG. 12 is one example of a computing environment in which elements of FIG. 5, or parts of it, (for example) can be deployed. With reference to FIG. 12, an example system for implementing some embodiments includes a general-purpose computing device in the form of a computer 910 programmed to generate as described above. Components of computer 910 may include, but are not limited to, a processing unit 920 (which can comprise processor(s)/server(s) from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 5 can be deployed in corresponding portions of FIG. 12.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 12 illustrates operating system 934, application programs 935, other program modules 936, and program data 937.

The computer 910 may also include other removable/non-removable volatile/nonvolatile computer storage media. By way of example only, FIG. 12 illustrates a hard disk drive 941 that reads from or writes to non-removable, nonvolatile magnetic media, nonvolatile magnetic disk 952, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 910. In FIG. 12, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a controller area network—CAN, local area network—LAN, or wide area network—WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 12 illustrates, for example, that remote application programs 985 can reside on remote computer 980.

It is noted while agricultural planting machines have been particularly discussed with respect to the examples described herein, other machines can also be implemented with said examples. Thus, the present disclosure is not limited to use of the systems and processes discussed with merely planting machines. They can be used with other machines as well, some of which are mentioned above.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It should also be noted that the different examples described herein can be combined in different ways. That is, parts of one or more examples can be combined with parts of one or more other examples. All of this is contemplated herein.

Example 1 is a control system for controlling an agricultural machine, the control system comprising:

an image processing system that obtains a representation of an image captured by an image sensor and that identifies residue and a seed on an agricultural surface in the captured image;

a seed/residue characteristic identifier system that identifies a characteristic of the identified residue;

an impact quantification system that generates a quantification indicator indicative of an impact of the identified residue on development of the seed based on the identified characteristic of the identified residue; and an action signal generator that generates an action signal based on the quantification indicator.

Example 2 is the control system of any or all previous examples and further comprising:

a control action identifier configured to identify an action to be performed based on the quantification indicator, the action signal generator generating the action signal to perform the identified action.

Example 3 is the control system of any or all previous examples wherein the action identifier accesses a characteristic-to-action mapping to identify the action based on at least one of the identified characteristic of the identified residue and the quantification indicator.

Example 4 is the control system of any or all previous examples wherein the action identifier accesses a characteristic-to-action model to identify the action based on at least one of the identified characteristic of the identified residue and the quantification indicator.

Example 5 is the control system of any or all previous examples wherein the image processing system is configured to identify a location of the seed and the residue in the image and wherein the seed/residue characteristic comprises:

a seed/residue separation identifier that identifies a separation between seed and residue based on the location of the seed and residue and wherein the impact quantification system generates the quantification indicator based on the separation between the seed and the residue.

Example 6 is the control system of any or all previous examples wherein the seed/residue characteristic identifier system comprises:

a seed distribution identifier that identifies a distribution of seed based on the identified seed in the image;

a residue distribution identifier that identifies a distribution of residue based on the identified residue in the image; and a distribution correlation system that correlates the distribution of seed to the distribution of residue and generates, as the identified characteristic, a correlation output indicative of the correlation of the distribution of seed to the distribution of residue.

Example 7 is the control system of any or all previous examples wherein the action signal generator comprises:

a height controller that generates, as the action signal, a height control signal that controls the height of a row cleaner on the agricultural machine relative to a frame of the agricultural machine based on the characteristic of the residue.

Example 8 is the control system of any or all previous examples wherein the action signal generator comprises:

a controller that generates, as the action signal, a seed placement signal that controls placement of seed on the agricultural surface based on the characteristic of the residue.

Example 9 is the control system of any or all previous examples wherein the action signal generator comprises:

a down force controller that generates, as the action signal, a down force control signal that controls the down force of a row cleaner on the agricultural machine based on the characteristic of the residue.

Example 10 is the control system of any or all previous examples wherein the action signal generator comprises:
a seed meter system controller that generates, as the action signal, a motor control signal that controls a seed meter motor based on the characteristic of the residue.

Example 11 is the control system of any or all previous examples wherein the action signal generator comprises:
a seed delivery system controller that generates, as the action signal, a motor control signal that controls a seed delivery motor based on the characteristic of the residue.

Example 12 is the control system of any or all previous examples wherein the action signal generator comprises:
an operator interface controller that generates, as the action signal, an operator interface control signal that controls an operator interface mechanism based on the characteristic of the residue.

Example 13 is the control system of any or all previous examples wherein the action signal generator comprises:
a communication system controller that generates, as the action signal, a communication system control signal that controls a communication system to send an indication of the quantification indicator and the characteristic of the residue to a remote computing system.

Example 14 is an agricultural machine, comprising:
a frame;
a row cleaner coupled to the frame;
a furrow opener coupled to the frame that opens a furrow in an agricultural surface over which the agricultural machine travels;
a seed delivery system that delivers seed to the furrow;
an image sensor configured to capture an image of the agricultural surface;
an image processing system that obtains a representation of an image captured by an image sensor and that identifies residue and a seed on an agricultural surface in the captured image;
a seed/residue characteristic identifier system that identifies a characteristic of the identified residue;
an impact quantification system that generates a quantification indicator indicative of an impact of the identified residue on development of the seed based on the identified characteristic of the identified residue; and
an action signal generator that generates an action signal based on the quantification indicator.

Example 15 is the agricultural machine of any or all previous examples and further comprising:
a control action identifier configured to identify an action to be performed based on the quantification indicator, by accessing characteristic-to-action information to identify the action based on at least one of the identified characteristic of the identified residue and the quantification indicator, the action signal generator generating the action signal to perform the identified action.

Example 16 is the agricultural machine of any or all previous examples wherein the image processing system is configured to identify a location of the seed and the residue in the image and wherein the seed/residue characteristic comprises:
a seed/residue separation identifier that identifies a separation between seed and residue based on the location of the seed and residue and wherein the impact quantification system generates the quantification indicator based on the separation between the seed and the residue.

Example 17 is the agricultural machine of any or all previous examples wherein the seed/residue characteristic identifier system comprises:
a seed distribution identifier that identifies a distribution of seed based on the identified seed in the image;
a residue distribution identifier that identifies a distribution of residue based on the identified residue in the image; and
a distribution correlation system that correlates the distribution of seed to the distribution of residue and generates, as the identified characteristic, a correlation output indicative of the correlation of the distribution of seed to the distribution of residue.

Example 18 is the agricultural machine of any or all previous examples wherein the action signal generator comprises:
a communication system controller that generates, as the action signal, a communication system control signal that controls a communication system to send an indication of the quantification indicator and the characteristic of the residue to a remote computing system.

Example 19 is a method of controlling an agricultural machine, the method comprising:
obtaining a representation of an image captured by an image sensor;
identifying residue and a seed on an agricultural surface in the captured image;
identifying a characteristic of the identified residue;
generating a quantification indicator indicative of an impact of the identified residue on development of the seed based on the identified characteristic of the identified residue; and
generating an action signal based on the quantification indicator.

Example 20 is the method of any or all previous examples wherein identifying residue and a seed comprises:
identifying a location of the seed and the residue in the image and wherein identifying the residue characteristic comprises identifying a separation between the seed and the residue based on the location of the seed and the residue and wherein generating a quantification indicator comprises generating the quantification indicator based on the separation between the seed and the residue.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A control system for controlling an agricultural machine, the control system comprising:
an image processing system that obtains a representation of an image captured by an image sensor and that identifies residue and a seed on an agricultural surface in the captured image;
a seed/residue characteristic identifier system that identifies a characteristic corresponding to the identified residue;
an impact quantification system that generates a quantification indicator that quantifies an impact of the iden- tified residue on development of the seed based on the identified characteristic corresponding to the identified residue; and an action signal generator that generates an action signal based on the quantification indicator.

2. The control system of claim 1 and further comprising:
a control action identifier configured to identify an action to be performed based on at least one of the identified characteristic corresponding to the identified residue or the quantification indicator, the action signal generator generating the action signal to perform the identified action.

3. The control system of claim 2 wherein the action identifier accesses a characteristic-to-action mapping to identify the action based on at least one of the identified characteristic corresponding to the identified residue or the quantification indicator.

4. The control system of claim 2 wherein the action identifier accesses a characteristic-to-action model to identify the action based on at least one of the identified characteristic corresponding to the identified residue or the quantification indicator.

5. The control system of claim 1 wherein the image processing system is configured to identify a location of the seed and a location of the residue in the image and wherein the seed/residue characteristic identifier system comprises:
a seed/residue separation identifier that identifies, as the characteristic corresponding to the identified residue, a separation between seed and residue based on the location of the seed and the location of the residue and wherein the impact quantification system generates the quantification indicator based on the separation between the seed and the residue.

6. The control system of claim 1 wherein the seed/residue characteristic identifier system comprises:
a seed distribution identifier that identifies a distribution of seed based on the identified seed in the image;
a residue distribution identifier that identifies a distribution of residue based on the identified residue in the image; and
a distribution correlation system that correlates the distribution of seed to the distribution of residue and generates, as the identified characteristic corresponding to the identified residue, a correlation output indicative of the correlation of the distribution of seed to the distribution of residue.

7. The control system of claim 1 wherein the action signal generator comprises:
a height controller that generates, as the action signal, a height control signal that controls the height of a row cleaner on the agricultural machine relative to a frame of the agricultural machine based on the identified characteristic corresponding to the identified residue.

8. The control system of claim 1 wherein the action signal generator comprises:
a controller that generates, as the action signal, a seed placement signal that controls placement of seed on the agricultural surface based on the identified characteristic corresponding to the identified residue.

9. The control system of claim 1 wherein the action signal generator comprises:
a down force controller that generates, as the action signal, a down force control signal that controls the down force of a row cleaner on the agricultural machine based on the identified characteristic corresponding to the identified residue.

10. The control system of claim 1 wherein the action signal generator comprises:
a seed meter system controller that generates, as the action signal, a motor control signal that controls a seed meter motor based on the identified characteristic corresponding to the identified residue.

11. The control system of claim 1 wherein the action signal generator comprises:
a seed delivery system controller that generates, as the action signal, a motor control signal that controls a seed delivery motor based on the identified characteristic corresponding to the identified residue.

12. The control system of claim 1 wherein the action signal generator comprises:
an operator interface controller that generates, as the action signal, an operator interface control signal that controls an operator interface mechanism based on the identified characteristic corresponding to the identified residue.

13. The control system of claim 1 wherein the action signal generator comprises:
a communication system controller that generates, as the action signal, a communication system control signal that controls a communication system to send an indication of the quantification indicator and the identified characteristic corresponding to the identified residue to a remote computing system.

14. An agricultural machine, comprising:
a frame;
a row cleaner coupled to the frame;
a furrow opener coupled to the frame that opens a furrow in an agricultural surface over which the agricultural machine travels;
a seed delivery system that delivers seed to the furrow;
an image sensor configured to capture an image of the agricultural surface;
an image processing system that obtains a representation of an image captured by an image sensor and that identifies residue and a seed on an agricultural surface in the captured image;
a seed/residue characteristic identifier system that identifies a characteristic corresponding to the identified residue;
an impact quantification system that generates a quantification indicator that quantifies an impact of the identified residue on development of the seed based on the identified characteristic corresponding to the identified residue; and
an action signal generator that generates an action signal based on the quantification indicator.

15. The agricultural machine of claim 14 and further comprising:
a control action identifier configured to access characteristic-to-action information to identify an action to be performed based on at least one of the identified characteristic corresponding to the identified residue or the quantification indicator, the action signal generator generating the action signal to perform the identified action.

16. The agricultural machine of claim 14 wherein the image processing system is configured to identify a location of the seed and a location of the residue in the image and wherein the seed/residue characteristic identifier system comprises;
a seed/residue separation identifier that identifies, as the characteristic corresponding to the identified residue, a separation between seed and residue based on the location of the seed and the location of the residue and wherein the impact quantification system generates the quantification indicator based on the separation between the seed and the residue.

17. The agricultural machine of claim 14 wherein the seed/residue characteristic identifier system comprises:
   a seed distribution identifier that identifies a distribution of seed based on the identified seed in the image;
   a residue distribution identifier that identifies a distribution of residue based on the identified residue in the image; and
   a distribution correlation system that correlates the distribution of seed to the distribution of residue and generates, as the identified characteristic corresponding to the identified residue, a correlation output indicative of the correlation of the distribution of seed to the distribution of residue.

18. The agricultural machine of claim 14 wherein the action signal generator comprises:
   a communication system controller that generates, as the action signal, a communication system control signal that controls a communication system to send an indication of the quantification indicator and the identified characteristic corresponding to the identified residue to a remote computing system.

19. A method of controlling an agricultural machine, the method comprising:
   obtaining a representation of an image captured by an image sensor;
   identifying residue and a seed on an agricultural surface in the captured image;
   identifying a characteristic corresponding to the identified residue;
   generating a quantification indicator that quantifies an impact of the identified residue on development of the seed based on the identified characteristic corresponding to the identified residue; and
   generating an action signal based on the quantification indicator.

20. The method of claim 19 wherein identifying residue and the seed comprises:
   identifying a location of the seed and a location of the residue in the image and wherein identifying the characteristic corresponding to the identified residue comprises identifying, as the characteristic corresponding to the identified residue, a separation between the seed and the residue based on the location of the seed and the residue and wherein generating a quantification indicator comprises generating the quantification indicator based on the separation between the seed and the residue.

* * * * *